US009473234B2

(12) United States Patent
Shreve et al.

(10) Patent No.: US 9,473,234 B2
(45) Date of Patent: Oct. 18, 2016

(54) ARRAY PROCESSING FOR SATELLITE COMMUNICATIONS

(71) Applicant: NORTHROP GRUMMAN SYSTEMS CORPORATION, Falls Church, VA (US)

(72) Inventors: Gregory Alan Shreve, San Pedro, CA (US); James Carl Schatzman, Aurora, CO (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 210 days.

(21) Appl. No.: 14/199,047

(22) Filed: Mar. 6, 2014

(65) Prior Publication Data

US 2015/0304019 A1    Oct. 22, 2015

(51) Int. Cl.
*H04B 7/185* (2006.01)
*H04B 7/04* (2006.01)
*H04B 17/309* (2015.01)

(52) U.S. Cl.
CPC ............ *H04B 7/185* (2013.01); *H04B 7/0413* (2013.01); *H04B 7/18517* (2013.01); *H04B 17/309* (2015.01)

(58) Field of Classification Search
CPC .......... H04B 7/18534; H04B 7/18517; H04B 7/18578; H04B 7/18536; H04B 7/18508; H04B 7/18513; H04B 7/18523
See application file for complete search history.

(56) References Cited

U.S. PATENT DOCUMENTS

| | | | | |
|---|---|---|---|---|
| 5,978,653 | A * | 11/1999 | Taylor | H04B 7/195 455/13.1 |
| 2003/0040852 | A1* | 2/2003 | Green | G01S 19/02 701/13 |
| 2005/0226414 | A1* | 10/2005 | Lee | H04B 7/1858 380/210 |
| 2007/0135051 | A1* | 6/2007 | Zheng | H04B 7/18563 455/63.1 |
| 2007/0184849 | A1* | 8/2007 | Zheng | H04B 7/06 455/456.1 |
| 2008/0268838 | A1* | 10/2008 | Zufall | H04B 7/18536 455/430 |
| 2009/0034448 | A1* | 2/2009 | Miller | H04B 7/1858 370/316 |

* cited by examiner

*Primary Examiner* — Alvin Zhu
(74) *Attorney, Agent, or Firm* — Nelson Mullins Riley & Scarborough LLP

(57) ABSTRACT

A satellite communications system includes a plurality of satellites that generate communications data over a plurality of channels. A plurality of antennas receives the communications data over the plurality of channels generated by the plurality of satellites. Each of the antennas receives a separate signal from each of the plurality of satellites over the channels. A converter digitizes each of the separate signals from each of the plurality of satellites received at the plurality of antennas. A processor forms separate digital beams from each of the separate signals digitized by the converter.

34 Claims, 7 Drawing Sheets

ARRAY PROCESSING FOR SATELLITE COMMUNICATIONS

TECHNICAL FIELD

This disclosure relates to satellite communications, and more particularly to a system and method that utilizes multiple channels and processing to efficiently transfer data from a plurality of satellites to a ground-based antenna array.

BACKGROUND

Satellite relay communications involve the use of artificial satellites to provide communication links between various points on earth. Such communications play a vital role in the global telecommunications system where approximately 2,000 artificial satellites orbiting earth relay analog and digital signals carrying voice, video, and data to and from one or many locations worldwide. Satellite communications include two main components: the ground segment, which consists of fixed or mobile transmission, reception, and ancillary equipment, and the space segment, which primarily is the satellite itself. A typical communications relay satellite link involves the transmission or uplinking of a signal from an earth station to a satellite, where the satellite then receives and amplifies the signal and retransmits it back to earth, where it is received and re-amplified by earth stations and terminals. Satellite receivers on the ground include direct-to-home (DTH) satellite equipment, mobile reception equipment in aircraft, satellite telephones, and handheld devices, for example. An applicable satellite architecture involves the sensing, recording, and processing of data by one or more satellites, where the data is to be transferred to ground terminals by downlink signals. The main components of a satellite consist of the communications system, which includes antennas and transponders that receive and/or retransmit signals, the power system, which includes solar panels that provide power, and the propulsion system, which includes rockets that propel the satellite into proper position.

One of the main issues with satellite sensing and communications is the tremendous costs involved when launching a satellite payload into orbit. Thus, the greater functionality and communications capability with a given satellite accordingly involves greater associated costs when launching the satellite into space. In order to mitigate such costs, satellites are being designed in a wide range of sizes that in some cases weigh 100 kilograms to 10 kilograms or less. Although the costs of launching such small payloads are greatly reduced, the communications capabilities of such small devices are greatly reduced in turn. Namely, the limited electrical power available on small satellites greatly reduces the transmissions capabilities of the satellites to earth stations. Sensor systems onboard the small spacecraft may be able to collect large volumes of data, but with no means to get the data to ground for processing, the collection capability is of no utility. Extending this problem to the situation where large numbers of small spacecraft are collecting immense volumes of data, and the problem of transmitting at very low power extremely large volumes of data to ground becomes one of critical importance.

SUMMARY

This disclosure relates to satellite communications and sensing systems. In one aspect, a satellite communications system includes a plurality of satellites that generate communications data over a plurality of channels. A plurality of antennas receives the communications data over the plurality of channels generated by the plurality of satellites. Each of the antennas receives a separate signal from each of the plurality of satellites over the channels. A converter digitizes each of the separate signals from each of the plurality of satellites received at the plurality of antennas. A processor forms separate digital beams from each of the separate signals digitized by the converter. The processor determines a collective signal for a selected satellite by summing each of the separate digital beams associated with each of the plurality of satellites, and utilizes the separate digital beams from the non-selected satellites from the plurality of satellites to filter cross-channel interference from the collective signal.

In another aspect, a satellite communications system includes a plurality of satellites that exchange coordination data and mission data over cross-links between each of the plurality of satellites to generate communications data over a plurality of channels. A plurality of antennas receives the communications data over the plurality of channels generated by the plurality of satellites, wherein each of the antennas receives a composite signal from the plurality of satellites over the channels. A converter digitizes the composite signal from the plurality of satellites received at each antenna in the plurality of antennas. A processor forms composite beams from the composite signal digitized by the converter. The processor analyzes the composite beams with respect to the coordination data to determine the mission data for a selected satellite from the plurality of satellites.

In yet another aspect, a method for satellite communications includes receiving data from each member of a satellite swarm to each member of a ground-based antenna array. The method includes forming a separate beam for each channel created between the satellite swarm and the ground-based antenna array. This includes determining a collective signal for a selected satellite by coherently summing each of the separate beams associated with each channel. The method includes filtering cross-channel interference from the collective signal by subtracting an interference contribution associated with the separate beams from the non-selected satellites.

In still yet another aspect, a method for satellite communications includes receiving data from each member of a satellite swarm to each member of a ground-based antenna array. The data includes coordination data and mission data that is shared between each member of the satellite swarm. The method includes forming a composite beam for each channel created between the satellite swarm and the ground-based antenna array. The method includes analyzing the composite beams for each channel with respect to the coordination data to determine the mission data for a selected satellite from the plurality of satellites.

DETAILED DESCRIPTION

Figure 1:
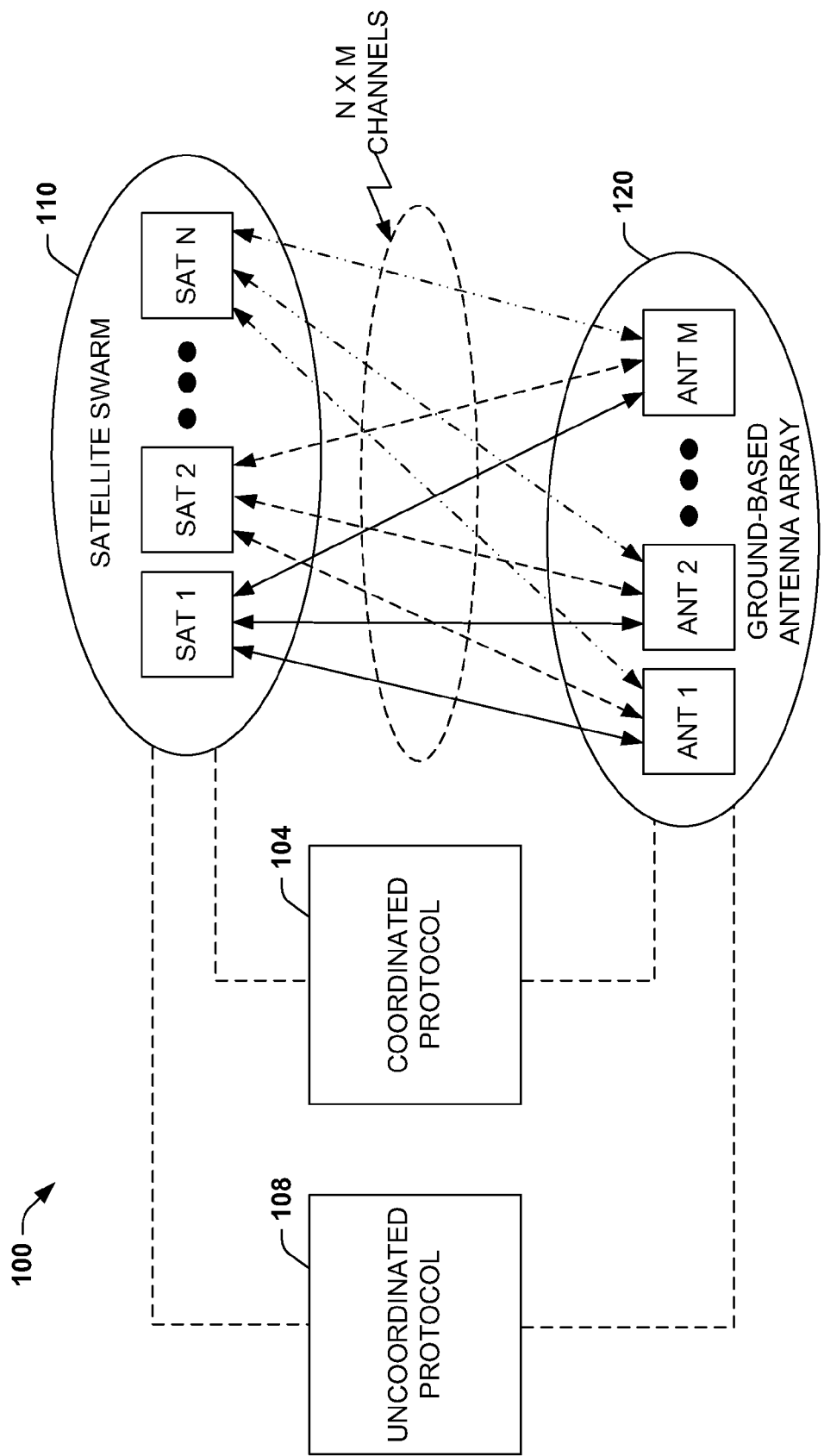
FIG. 1 illustrates an example of a satellite communications system that employs coordinated or uncoordinated protocols over multiple channels to transfer data between a satellite swarm and a ground-based antenna array.

This disclosure relates to a system and method that utilizes multiple channels and processing to efficiently transfer high data rate streams of information, transmitted at very low power, from a plurality of satellites to a ground-based antenna array. The plurality of satellites can be referred to as a satellite swarm which refers to a group of satellites with known positions and motion over a period of time. For instance, the satellite grouping defining the swarm may be located in a near-earth orbital pattern that obits the earth periodically (e.g., every 90 minutes) and can be communicated with via a ground-based antenna array. The swarm can also include one or more satellite members from other orbital regimes, including medium earth orbit, geosynchronous orbit, and high earth orbit as well.

By utilizing multiple antennas on the ground, a plurality of communications channels can be created between the satellite swarm and the ground-based antenna array where one channel is formed between each member of the satellite swarm and each member of the ground-based antenna array. Thus, if N satellites are in the satellite swarm and M antennas are in the ground-based antenna array, N×M channels can be formed, wherein N and M are positive integers. Multiple input and multiple output (MIMO) and space-time coding protocols can be employed to communicate data between the members of the satellite swarm and the members of the ground-based antenna array. In contrast to typical earth-based MIMO communications however, that rely on an indeterminate or variable number of channels such as via building interference and so forth, the N×M multiple line-of-sight channels are constructed from a known or predetermined number of members in the satellite swarm and a predetermined number of members in the ground-based antenna array, where small ionospheric or multipath effects are generally incidental. As such, various processing methods can be employed to efficiently communicate data from space to ground while minimizing cost both in space and on the ground.

In one aspect, uncoordinated protocols can be employed where each member of the satellite swarm operates independently and beamforming is performed on the ground to both determine a collective signal from the members of the ground-based array for a selected satellite and to filter cross-channel interference from the collective signal by forming nulls in the directions of some or all of the other members of the swarm. In another aspect, coordinated protocols can be employed. Cross-links can be established between each member of the swarm where both mission data (e.g., the type of data a particular satellite collects/generates) and coordination data are exchanged between each of the members of the swarm. The coordination data can be utilized for transmit beamforming in space to enhance signal reception on the ground. The swarm cooperates to concurrently form beams that direct RF data streams to each of the ground stations in view. The coordination data can also be used to help extract data for a given satellite from the concurrent transmissions of the other members of the swarm.

In yet another aspect, channel monitoring can be performed on the ground where channel conditions can be detected. In this example, channel refers to the conditions of the space, atmospheric and ground environments that effect the propagation of RF energy from the spacecraft to the ground stations. For instance, channel quality can be detected (e.g., bit error rate defining channel quality) and utilized to send commands to the satellites to increase and/or decrease a respective data transmissions rate based on the detected quality. By spreading out the required receiving capabilities across the array of ground antennas, lower cost receivers can be employed on the ground while providing a high collective gain for each satellite in the swarm by utilizing beamforming and processing on the ground for each of the channels. Moreover, satellite costs can be minimized since the beamforming gains via the ground-based array allows each satellite to transmit with lower power.

FIG. 1 illustrates an example of a satellite communications system 100 that employs coordinated protocol 104 or uncoordinated protocol 108 over multiple channels to transfer data between a satellite swarm 110 and a ground-based antenna array 120. As used herein, coordinated protocol 104 refers to communications where coordination data is exchanged between each member of the satellite swarm 110, where localized beamforming is performed at each member of the swarm in addition to beamforming performed at the ground via each member of the ground-based antenna array 120. With respect to uncoordinated protocol 108, each member of the satellite swarm 110 operates independently and all beamforming is performed at the ground via each member of the ground-based antenna array 120.

Also, as used herein beamforming (or spatial filtering) refers to a signal processing method used for antenna arrays for directional signal transmission and/or reception. This can be achieved by combining elements in a phased array in such a manner that signals at particular angles experience constructive interference while others experience destructive interference. Beamforming can be used at both the transmitting and receiving ends in order to achieve spatial selectivity when utilizing the coordinated protocol 104. The gain improvement utilizing beamforming compared with omnidirectional reception/transmission is known as the receive/transmit gain (or loss). To change the directionality of the array when transmitting (e.g., from space), a beamformer controls the phase and relative amplitude of the signal at each transmitter, in order to create a pattern of constructive and destructive interference in the wavefront. When receiving, information from different antennas, data can be combined in a manner where the expected pattern of radiation is preferentially observed.

The satellite swarm 110 includes a plurality of satellites shown as satellites 1 though N, with N being a positive integer and defines a group of satellites that can be located at a given position over a period of time. The satellite grouping defining the satellite swarm 110 may be located in a near-earth orbital pattern that obits the earth periodically and can be communicated with via the ground-based antenna array 120 at a given point in time. The satellite swarm 110 can also include one or more satellite members from geosynchronous obits as well. By utilizing multiple antennas on the ground in the ground-based antenna array 120 and shown as antennas 1 though M with M being a positive integer, a plurality of communications channels can be created between the satellite swarm 110 and the ground-based antenna array 120 where one channel is formed between each member of the satellite swarm 110 and each member of the ground-based antenna array 120. If N satellites are in the satellite swarm 110 and M antennas are in the ground-based antenna array 120, then N×M channels can be formed.

Multiple input and multiple output (MIMO) protocols can be employed to communicate data between the members of the satellite swarm 110 and the members of the ground-based antenna array 120. In contrast to typical earth-based MIMO communications however, that rely on an indeterminate or variable number of channels such as via building interference or other indeterminate paths, the N×M channels are constructed from a predictable number of members in the satellite swarm 110 and a predictable number of members in the ground-based antenna array 120. As such, various processing methods can be employed to efficiently extract data from space-based vehicles while minimizing cost both in space and on the ground. Processing systems for extracting data are illustrated and described below with respect to FIGS. 2, 3, and 4. Processing methods for extracting data are illustrated and described below with respect to FIGS. 5, 6, and 7.

In one aspect, the uncoordinated protocol 108 can be employed where each member of the satellite swarm 110 operates independently and beamforming is performed on the ground to isolate the individual signals for each satellite and to filter cross-channel interference from the collective signal utilizing the beams generated from the other members of the swarm. In another aspect, the coordinated protocol 104 can be employed. For example, cross-links can be established between each member of the satellite swarm 110 where both mission data (e.g., the type of data a particular satellite collects/generates) and coordination data are exchanged between each of the members of the swarm. The coordination data can be utilized for local beamforming in space to enhance signal reception on the ground. The coordination data can also be used to help extract data for a given satellite from the concurrent transmissions of the other members of the satellite swarm 110. In yet another aspect, channel monitoring can be performed on the ground where channel conditions can be detected. For instance, channel delay, dispersion, and quality can be detected (e.g., bit error rate defining channel quality) and used to optimize the overall space-to-ground throughput. Channel information can be utilized to determine which commands to send to the satellites in the swarm 110 to increase and/or decrease a respective data transmissions rate based on the detected quality. By spreading out the sensing capabilities across the ground-based antenna 120, lower cost receivers can be employed on the ground while providing a collective gain for each satellite in the swarm 110 by utilizing beamforming and processing on the ground for each of the N×M channels.

Moreover, satellite costs can be minimized since the beamforming gains via the ground-based array and/or spaced-based beamforming allows each satellite to transmit with lower power utilization.

Figure 2:
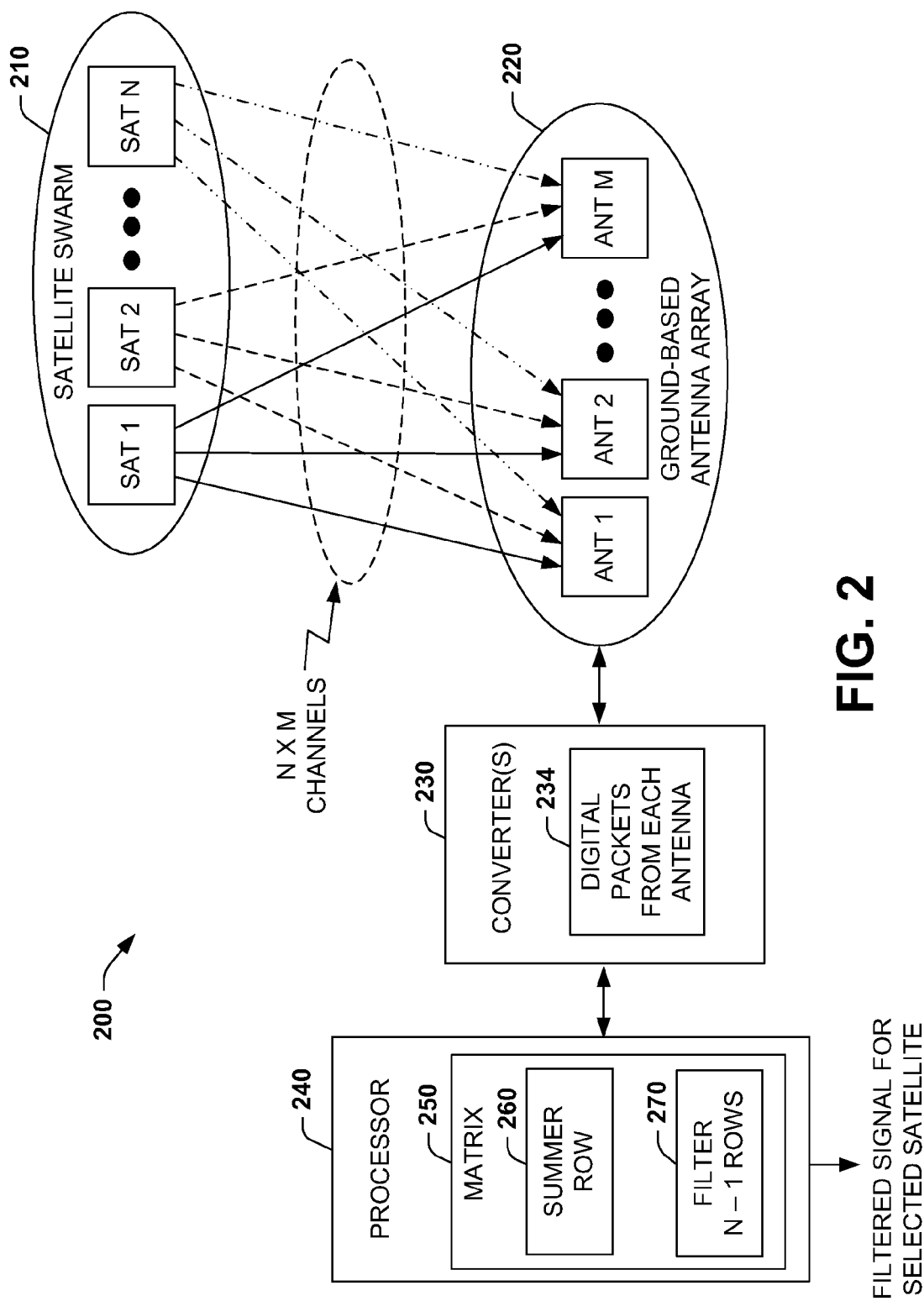
FIG. 2 illustrates an example of a satellite communications system that employs uncoordinated protocols over multiple channels and ground-based beam forming to transfer data between a satellite swarm and a ground-based antenna array.

FIG. 2 illustrates an example of a satellite communications system 200 that employs an uncoordinated protocol over channels and ground-based beam forming to transfer data between a satellite swarm 210 and a ground-based antenna array 220. The satellite swarm 220 includes a plurality of satellites, shown as satellites 1 through N, that transmit mission data over a plurality of channels. The ground-based antenna array 220 includes a plurality of antennas that receive the mission data over the plurality of channels generated by the plurality of satellites. Each of the antennas 220 receives a separate signal from each of the plurality of satellites over the channels, but since all satellites use the same time-frequency space, the signals can interfere with each other. Converters 230 digitize each of the composite signals from the plurality of satellites 210 received at the plurality of antennas 220 into digital packets 234. A processor 240 forms separate beams via the digital packets 234 from each of the separate signals digitized by the converter 230. This allows the signals to be separated based on their spatial characteristics even though they cannot be separated based on their time-frequency characteristics. The ground processors 240 determine a collective signal for a selected satellite by coherently summing each of the separate beams associated with each of the plurality of satellites 210, and they utilize the separate beams from the non-selected satellites from the plurality of satellites to filter cross-channel interference from the collective signal.

The plurality of antennas 220 includes at least one of a ground based receiving antenna and/or a ground based transmitter/receiver antenna. As shown, N×M channels can be formed between the plurality of satellites 210 and the plurality of antennas 220, wherein N is a positive integer associated with the number of satellites and M is a positive integer associated with the number of antennas. The processor 240 can format a matrix 250 that includes N rows for each of the plurality of satellites 210 having M columns associated with each of the antennas 220.

The processor 240 employs one of the N rows of the matrix shown as summer row 260 to determine the collective signal for each selected satellite by coherently summing each of the beams associated with the plurality of satellites. The processor 240 employs N−1 rows of the matrix shown as filter rows 270 for the separate beams from the non-selected satellites from the plurality of satellites to filter cross-channel interference from the collective signal. Timing and phase information can be received via the digital packets 234 from the plurality of satellites 210 and employed by the processor 240 to filter the cross-channel interference from the collective signal via the matrix 250. In one example, the processor 240 formats M columns of the matrix 250 to include a term for each of the M antennas 220, wherein each term in each column of the matrix includes the magnitude and phase information for each of the plurality of satellites 210 multiplied by the separate signal for each of the M antennas 220.

The processor 240 can determine the collective signal by coherently summing one row of the matrix 250 and employs the other N−1 rows of the matrix as a cancellation sum to subtract cross-channel interference to the collective signal attributed to the non-selected satellites of the plurality of satellites 210. A plurality of matrixes can be similarly formatted by the processor 240 to determine a separate collective signal for each satellite from the plurality of satellites and to filter cross-channel interference from each of the plurality of satellites from the separate collective signals. The converter 230 can be an analog-to-digital (A/D) converter that operates in the antennas 220, is a separate A/D converter that digitizes data received from each of the ground based antennas, or is an internal A/D of the processor 240 that digitizes data received from each of the ground based antennas. In other examples (e.g., for coordinated protocol), the converter 230 can also include digital-to-analog (D/A) converters to send digital commands to the respective satellites 210. The communications data can be transferred over the N×M channels between the plurality of satellites 210 and the plurality of antennas according to a multiple input and multiple output protocol (MIMO), for example.

Figure 3:
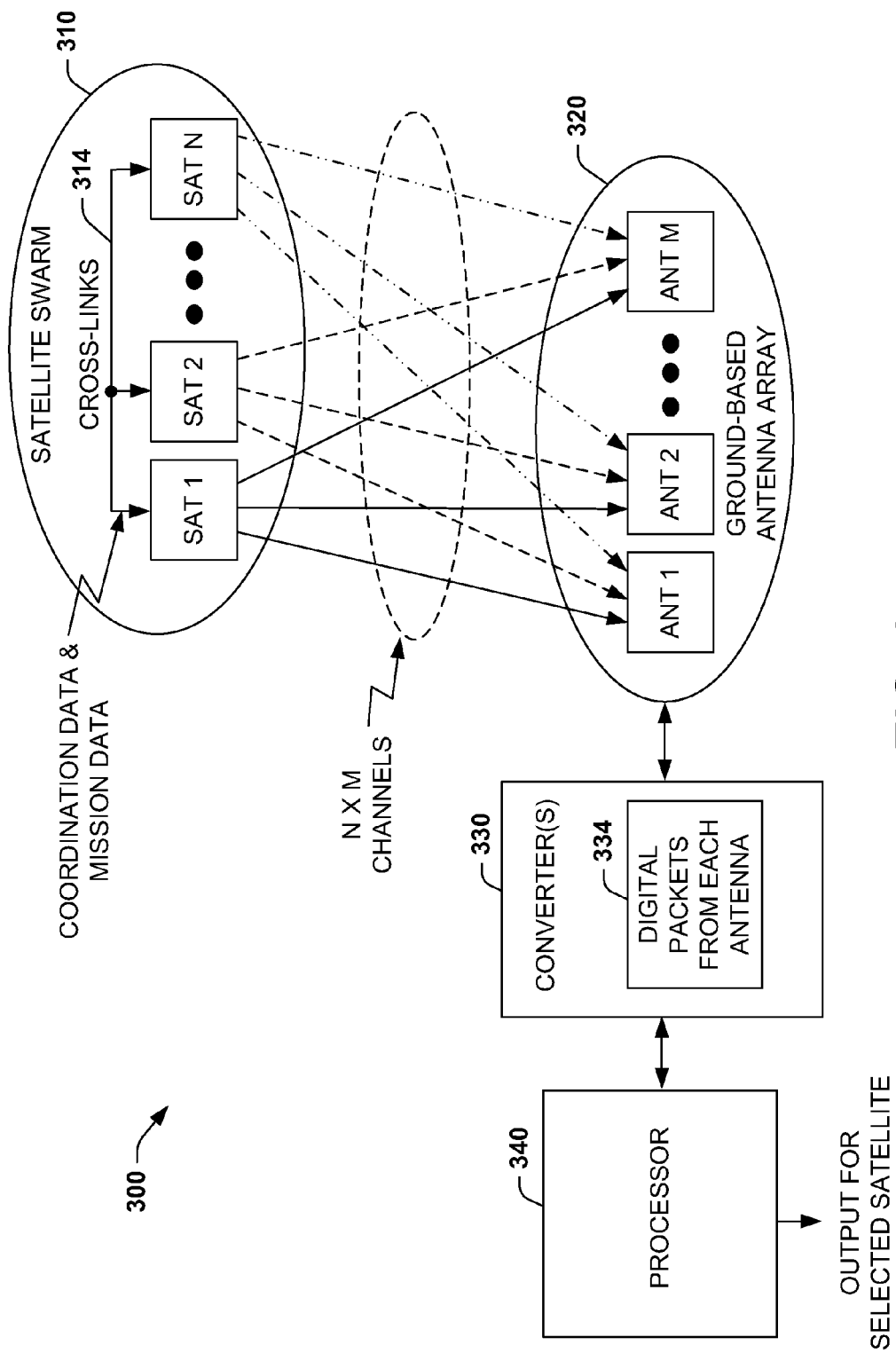
FIG. 3 illustrates an example of a satellite communications system that employs coordinated protocols over multiple channels with space-based and ground-based beam forming to transfer data between a satellite swarm and a ground-based antenna array.

FIG. 3 illustrates an example of a satellite communications system 300 that employs coordinated protocols over multiple channels with space-based and ground-based beam forming to transfer data between a satellite swarm 310 and a ground-based antenna array. The satellite swarm 310 includes a plurality of satellites that exchange coordination data and mission data over cross-links 314 between each of the plurality of satellites to generate communications data over a plurality of channels. The ground based antenna array 320 includes a plurality of antennas that receive the communications data over the plurality of channels generated by the plurality of satellites 310. Each of the antennas 320 receives a separate signal from each of the plurality of satellites 310 over the channels. A converter 330 digitizes each of the separate signals into digital packets 334 representing data received from each of the plurality of satellites 310 and received at the plurality of antennas 320. A processor 340 forms separate beams from each of the separate signals digitized by the converter 330. The processor 340 analyzes the separate beams with respect to the coordination data to determine the mission data for a selected satellite from the plurality of satellites 310. The plurality of antennas 320 can include at least one of a ground based receiving antenna and/or a ground based transmitter/receiver antenna, for example.

The coordination data can include position data and velocity data for each of the plurality of satellites 310. The position data and the velocity data can be determined from a predictive model and/or determined by instruments on each of the plurality of satellites. Such instruments can include navigation components and accelerometers, for example. In one example, a given satellite of the plurality of satellites 310 utilizes the coordination data to perform a data time-shift and time-scaling with respect to data transmissions from each of the other satellites of the plurality of satellites to maximize reception of data generated by the given satellite at a selected antenna from the plurality of antennas 320. Time-shifting can be employed to compensate for the differences in travel time and time-scaling can be employed to compensate for the differences in Doppler shift between the spacecrafts' antennas as reference to a given ground antenna. After exchanging mission and coordination data, each of the plurality of satellites can similarly perform such time-shifting and time-scaling to optimize reception on the ground. Each of the plurality of satellites can form a separate beam for transmitting the communications data over the plurality of channels. Thus, in the coordinated protocol example, beamforming occurs both in space and on the ground. The communications data can be transferred over the N×M channels between the plurality of satellites 310 and the plurality of antennas 320 according to a multiple input and multiple output protocol (MIMO), for example.

Figure 4:
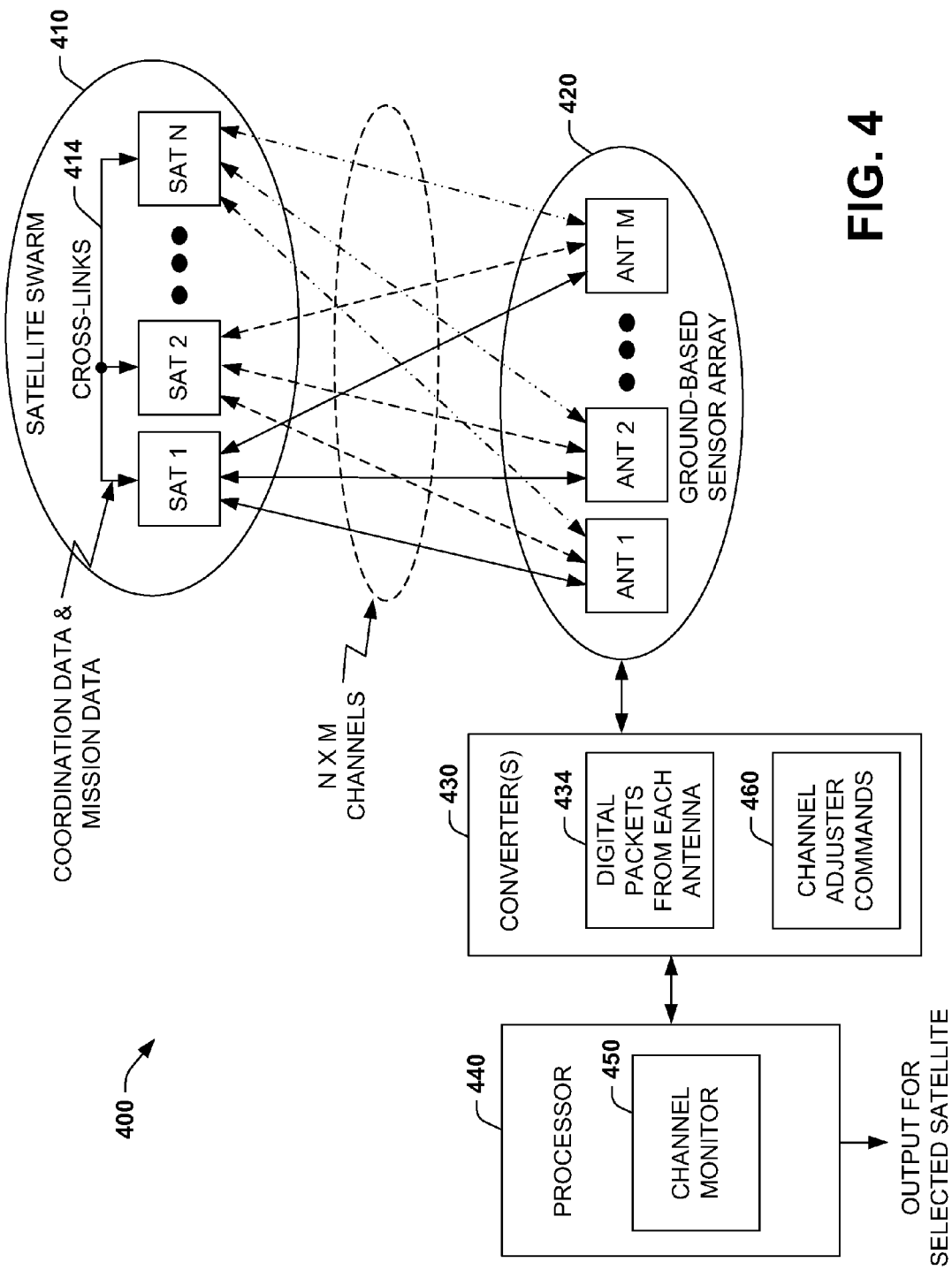
FIG. 4 illustrates an example of a satellite communications system that employs coordinated protocols over multiple channels with space-based and ground-based beam forming to transfer data between a satellite swarm and a ground-based antenna array and includes channel monitoring and control of channel data rates.

FIG. 4 illustrates an example of a satellite communications system 400 that employs coordinated protocols over multiple channels with space-based and ground-based beam forming to transfer data between a satellite swarm 410 and a ground-based antenna array 420 and includes channel monitoring and control of channel data rates. The satellite swarm 410 includes a plurality of satellites that exchange coordination data and mission data over cross-links 414 between each of the plurality of satellites to generate communications data over a plurality of channels. The ground based antenna array 420 includes a plurality of antennas that receive the communications data over the plurality of channels generated by the plurality of satellites 410. Each of the antennas 420 receives a separate signal from each of the plurality of satellites 410 over the channels. A converter 430 digitizes each of the separate signals into digital packets 434 representing data received from each of the plurality of satellites 410 and received at the plurality of antennas 420. A processor 440 forms separate beams from each of the separate signals digitized by the converter 430.

The processor 440 analyzes the separate beams with respect to the coordination data to determine the mission data for a selected satellite from the plurality of satellites 410. In this example, a channel monitor 450 determines the quality of a selected channel between one of the plurality of satellites 410 and one of the antennas 420. For example, the quality of the selected channel can be based on a bit error rate (BER) for a selected channel however other criterion could include a signal-to-noise ratio. In some cases, the channel monitor 450 may detect that one or more of the N×M channels is not performing as well as some of the other channels. In such a case, the processor 440 can issue a channel compensation command 460 that communicates a data transfer rate increase or decrease to at least one of the satellites of the plurality of satellites 410 based on the determined quality of the selected channel. Thus, higher-performing data channels can operate at maximum bandwidth and lower performing channels can operate at a lower bandwidth. As conditions change, channel data rates can be increased and/or decreased accordingly.

Figure 5:
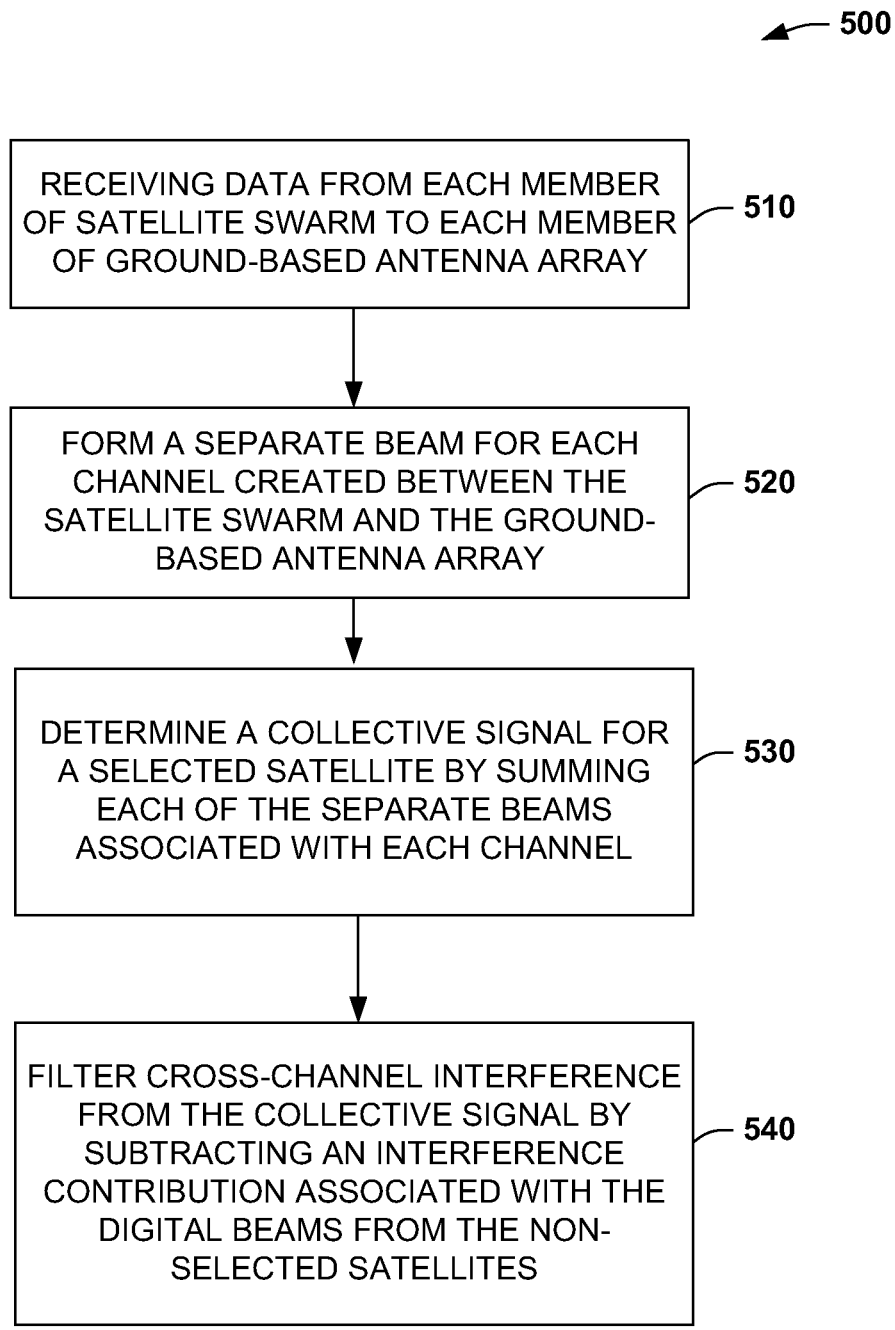
FIG. 5 illustrates an example of a satellite communications method that employs uncoordinated protocol to transfer data between a satellite swarm and a ground-based antenna array.
Figure 6:
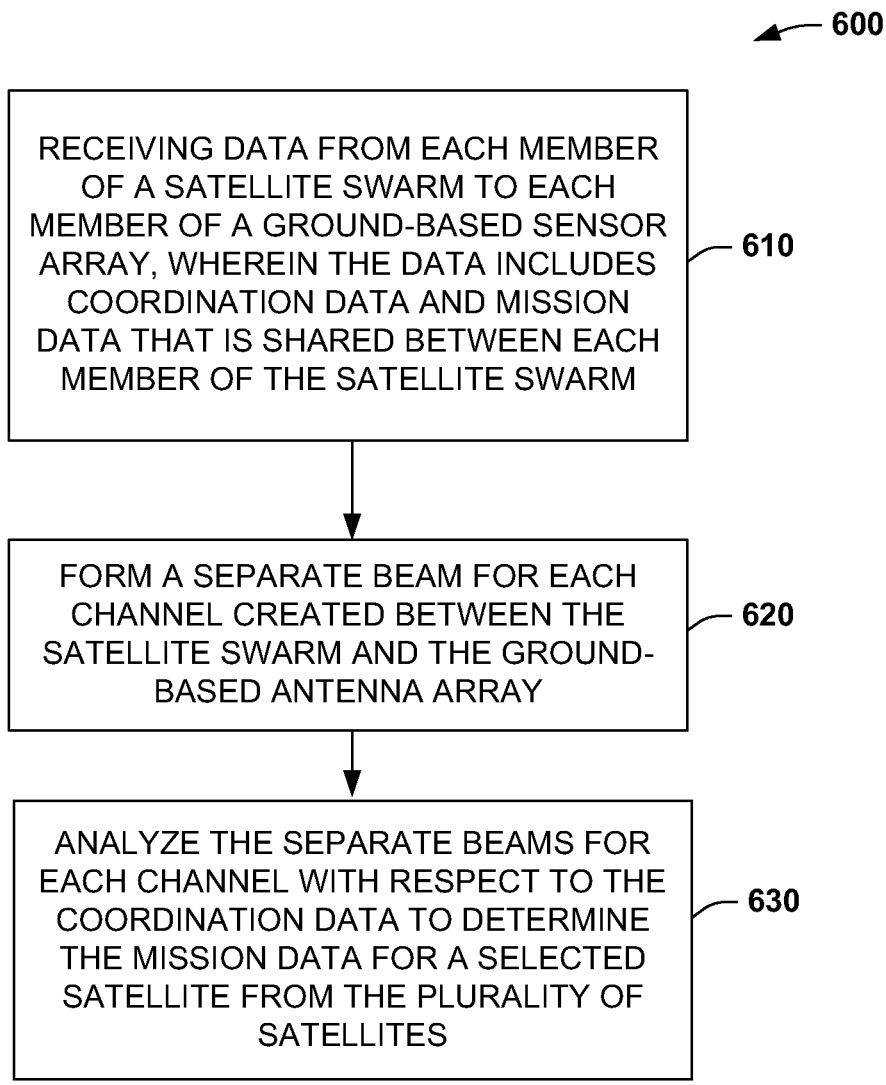
FIG. 6 illustrates an example of a satellite communications method that employs coordinated protocol to transfer data between a satellite swarm and a ground-based antenna array.
Figure 7:
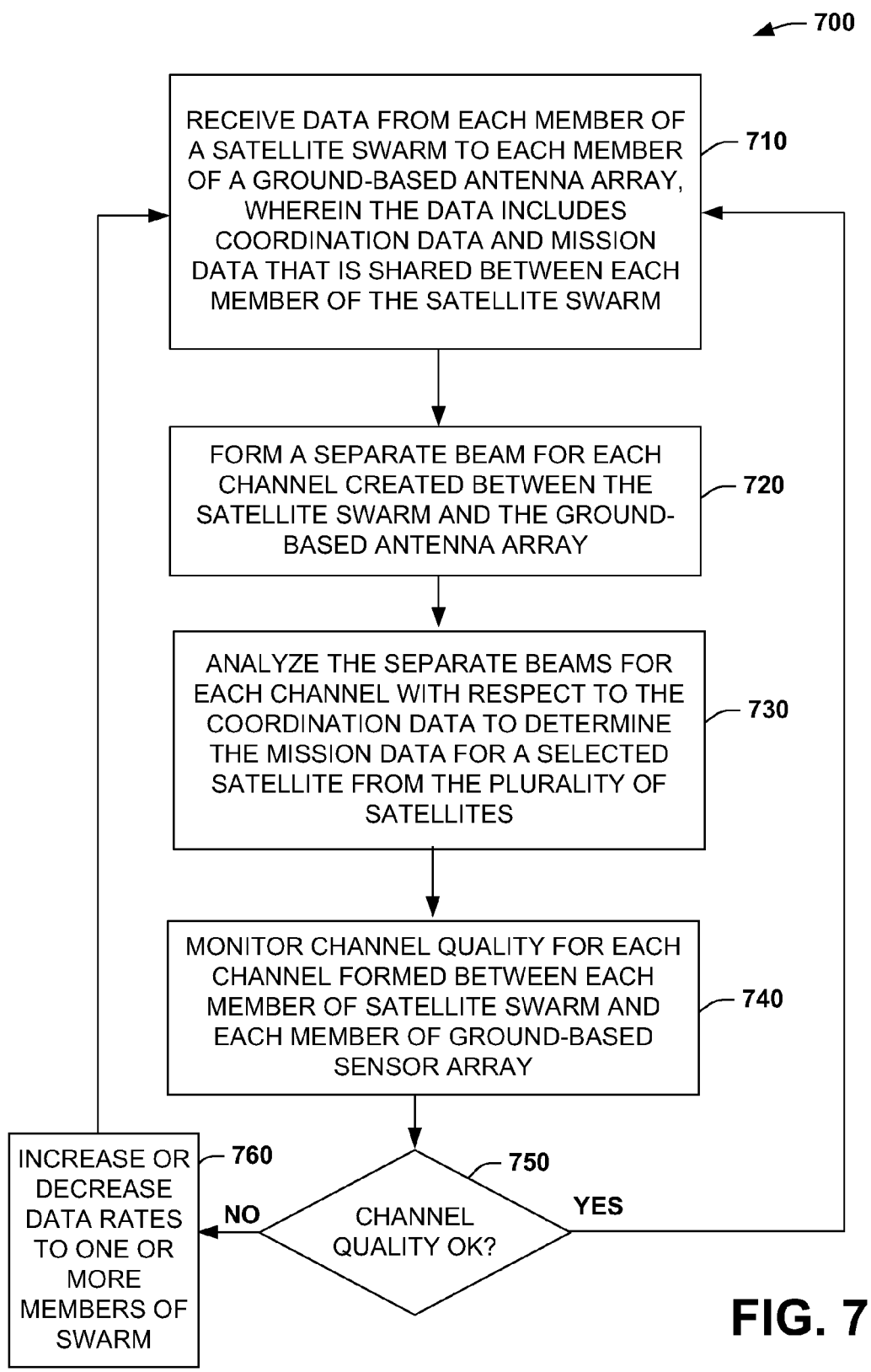
FIG. 7 illustrates an example of a satellite communications method that employs coordinated protocol to transfer data between a satellite swarm and a ground-based antenna array and includes channel monitoring and control of channel data rates.

In view of the foregoing structural and functional features described above, methodologies in accordance with various aspects of the present invention will be better appreciated with reference to FIGS. 5, 6, and 7. While, for purposes of simplicity of explanation, the methodologies are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. The various acts of the methods depicted in FIGS. 5, 6, and 7 can be executed automatically such as via a processor, computer, and/or controller configured with executable instructions to carry out the various acts described herein.

FIG. 5 illustrates an example of a satellite communications method 500 that employs uncoordinated protocol to transfer data between a satellite swarm and a ground-based antenna array. At 510, the method 500 includes receiving data from each member of a satellite swarm member of a ground-based antenna array (e.g., via array 220 of FIG. 2). At 520, the method 500 includes forming a separate beam for each channel created between the satellite swarm and the ground-based antenna array (e.g., via processor 240 of FIG. 2). At 530, the method 500 includes determining a collective signal for each satellite by coherently summing each of the separate beams associated with each channel (e.g., via processor 240 of FIG. 2). At 540, the method 500 includes filtering cross-channel interference from the collective signal by subtracting an interference contribution associated with the beams from the non-selected satellites (e.g., via processor 240 of FIG. 2).

Although not shown, the method 500 can include forming a matrix, where the matrix includes N rows for each member of the satellite swarm having M columns associated with each member of the ground-based antenna array. This can include employing one of the N rows of the matrix to determine the collective signal for the selected satellite by coherently summing each of the separate beams associated with each member of the satellite swarm and employing N−1 rows of the matrix for the separate beams from the non-selected satellites from the satellite swarm to filter cross-channel interference from the collective signal. The method 500 can include receiving timing and phase information from the satellite swarm and filtering the cross-channel interference from the collective signal via the matrix. This can include formatting M columns of the matrix to include a term for each member of the ground-based antenna array. Each term in each column of the matrix includes the phase information for each member of the satellite swarm multiplied by the separate signal for each member of the ground-based antenna array, for example. The method 500 can also include determining the collective signal by coherently summing one row of the matrix and employing the other N−1 rows of the matrix as a cancellation sum to subtract cross-channel interference to the collective signal attributed to the non-selected satellites of the satellite swarm.

FIG. 6 illustrates an example of a satellite communications method 600 that employs coordinated protocol to transfer data between a satellite swarm and a ground-based antenna array. At 610, the method 600 includes receiving data from each member of a satellite swarm to each member of a ground-based antenna array, wherein the data includes coordination data and mission data that is shared between each member of the satellite swarm (e.g., via ground-based antenna array 320 of FIG. 3). At 620, the method 600 includes forming a separate beam for each channel created between the satellite swarm and the ground-based antenna array (e.g., via processor 340 of FIG. 3). At 630, the method 600 includes analyzing the separate beams for each channel with respect to the coordination data to determine the mission data for a selected satellite from the plurality of satellites (e.g., via processor 340 of FIG. 3). As noted previously, the coordination data can include position data and velocity data for each of the plurality of satellites, for example.

Although not shown, the method 600 can also include determining the position data and the velocity data from a predictive model and/or by instrumenting each member of the satellite swarm, for example. Measurements may include active RF or optical pinging from element to element of the swarm; it may include passive observations of calibration signals from space or from the ground; for example, Global Positioning System (GPS) signals and other navigational broadcast signals can be used for this purpose. The method 600 can also include utilizing the coordination data to perform a data time-shift with respect to data transmissions from each of the other members of the satellite swarm to maximize reception of data generated by a given satellite at a selected antenna from the ground-based antenna array. For example, this can include optimizing phase and amplitude information to promote constructive and/or destructive interference at a given member of the antennas.

FIG. 7 illustrates an example of a satellite communications method 700 that employs coordinated protocol to transfer data between a satellite swarm and a ground-based antenna array and includes channel monitoring and control of channel data rates. At 710, the method 700 includes receiving data from each member of a satellite swarm to each member of a ground-based antenna array, wherein the data includes coordination data and mission data that is shared between each member of the satellite swarm (e.g., via ground-based antenna array 420 of FIG. 4). At 720, the method 700 includes forming a separate beam for each channel created between the satellite swarm and the ground-based antenna array (e.g., via processor 440 of FIG. 4). At 730, the method 700 includes analyzing the separate beams for each channel with respect to the coordination data to determine the mission data for a selected satellite from the plurality of satellites (e.g., via processor 440 of FIG. 4). As noted previously, the coordination data can include position data and velocity data for each of the plurality of satellites, for example.

At 740, the method 700 includes monitoring channel quality for each channel formed between each member of the satellite swarm and each member of the ground-based antenna array. At 750, a determination is made as to whether or not the channel quality is suitable. For example, whether or not the bit error rate for a given channel is above a predetermined threshold. If the channel quality is suitable at 750, the method 700 proceeds back to 710 to receive more data. If the channel quality is not deemed suitable at 750, the method 700 proceeds to 760 where a data rate increase or decrease is commanded to one or more members of the swarm. After an adjustment has been made at 760, the method 700 proceeds back to 710 to receive more data.

Although not shown, the method 700 can also include determining the position data and the velocity data from a predictive model and/or by instrumenting each member of the satellite swarm, for example. The method 700 can also include utilizing the coordination data to perform a data time-shift with respect to data transmissions from each of the other members of the satellite swarm to maximize reception of data generated by a given satellite at a selected antenna from the ground-based antenna array. For example, this can include optimizing phase, amplitude and Doppler information to promote constructive and/or destructive interference at a given member of the antennas.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A satellite communications system, comprising:
   a plurality of satellites that generate communications data over a plurality of channels;

a plurality of antennas that receive the communications data over the plurality of channels generated by the plurality of satellites, wherein each of the antennas receives a separate signal from each of the plurality of satellites over the channels;

a converter to digitize each of the separate signals from each of the plurality of satellites received at the plurality of antennas; and a processor that forms separate digital beams from each of the separate signals digitized by the converter, wherein the processor determines a collective signal for a selected satellite by summing each of the separate digital beams associated with each of the plurality of satellites, and utilizes the separate digital beams from the non-selected satellites from the plurality of satellites to filter cross-channel interference from the collective signal.

2. The satellite communications system of claim 1, wherein the plurality of antennas includes at least one of a ground based receiving antenna and a ground based transmitter/receiver antenna.

3. The satellite communications system of claim 1, further comprising N×M channels that are formed between the plurality of satellites and the plurality of antennas, wherein N is a positive integer associated with the number of satellites and M is a positive integer associated with the number of antennas.

4. The satellite communications system of claim 3, further comprising a matrix that is formatted by the processor, wherein the matrix includes N rows for each of the plurality of satellites having M columns associated with each of the antennas.

5. The satellite communications system of claim 4, wherein processor employs one of the N rows of the matrix to determine the collective signal for the selected satellite by coherently summing each of the separate beams associated with each of the plurality of satellites and the processor employs N−1 rows of the matrix for the separate beams from the non-selected satellites from the plurality of satellites to filter cross-channel interference from the collective signal.

6. The satellite communications system of claim 5, wherein timing and phase information is received from the plurality of satellites and employed by the processor to filter the cross-channel interference from the collective signal via the matrix.

7. The satellite communications system of claim 6, wherein the processor formats M columns of the matrix to include a term for each of the M antennas, wherein each term in each column of the matrix includes the magnitude and phase information for each of the plurality of satellites multiplied by the separate signal for each of the M antennas.

8. The satellite communications system of claim 7, wherein the processor determines the collective signal by coherently summing one row of the matrix and the processor employs the other N−1 rows of the matrix as a cancellation sum to subtract cross-channel interference to the collective signal attributed to the non-selected satellites of the plurality of satellites.

9. The satellite communications system of claim 8, further comprising a plurality of matrixes that are formatted by the processor to determine a separate collective signal for each satellite from the plurality of satellites and to filter cross-channel interference from each of the plurality of satellites from the separate collective signal.

10. The satellite communications system of claim 1, wherein the converter is an analog-to-digital (A/D) converter that operates in the ground stations, is a separate A/D converter that digitizes data received from each of the ground based antennas, or is an internal A/D of the processor that digitizes data received from each of the plurality of antennas.

11. The satellite communications system of claim 1, wherein the communications data is transferred over the channels between the plurality of satellites and the plurality of antennas according to a multiple input and multiple output protocol (MIMO).

12. A satellite communications system, comprising:

a plurality of satellites that exchange coordination data and mission data over cross-links between each of the plurality of satellites to generate communications data over a plurality of channels;

a plurality of antennas that receive the communications data over the plurality of channels generated by the plurality of satellites, wherein each of the antennas receives a composite signal from each of the plurality of satellites over the channels;

a converter to digitize each of the composite signals from the plurality of satellites received at the plurality of antennas; and a processor that forms composite beams from the composite signals digitized by the converter, wherein the processor analyzes the composite beams with respect to the coordination data to determine the mission data for a selected satellite from the plurality of satellites.

13. The satellite communications system of claim 12, wherein the plurality of groundbased antennas include at least one of a ground based receiving antenna and a ground based transmitter/receiver antenna.

14. The satellite communications system of claim 12, wherein the coordination data includes position data and velocity data for each of the plurality of satellites.

15. The satellite communications system of claim 14, wherein the position data and the velocity data is determined from a predictive model or determined by instruments on each of the plurality of satellites.

16. The satellite communications system of claim 12, wherein a given satellite of the plurality of satellites utilizes the coordination data to perform a data time-shift with respect to data transmissions from each of the other satellites of the plurality of satellites to maximize reception of data generated by the given satellite at a selected antenna from the plurality of antennas.

17. The satellite communications system of claim 12, wherein each of the plurality of satellites form a composite beam for transmitting the communications data over the plurality of channels.

18. The satellite communications system of claim 12, wherein the communications data is transferred over the channels between the plurality of satellites and the plurality of antennas according to a multiple input and multiple output protocol (MIMO).

19. The satellite communications system of claim 12, further comprising a channel monitor to determine the quality of a selected channel between one of the plurality of satellites and one of the antennas.

20. The satellite communications system of claim 19, wherein the quality of the selected channel is based on a bit error rate (BER).

21. The satellite communications system of claim 19, further comprising a channel compensation command that communicates a data transfer rate increase or decrease to at least one of the satellites of the plurality of satellites based on the determined quality of the selected channel.

22. A method for satellite communications, comprising:
receiving, by a processor, data from each member of a satellite swarm to each member of a ground-based antenna array;
forming, by the processor, a separate beam for each channel created between the satellite swarm and the ground-based antenna array;
determining, by the processor, a collective signal for a selected satellite by coherently summing each of the separate beams associated with each channel; and
filtering, by the processor, cross-channel interference from the collective signal by subtracting an interference contribution associated with the separate beams of the non-selected satellites from the collective signal.

23. The method of claim 22, further comprising forming a matrix, by the processor, wherein the matrix includes N rows for each member of the satellite swarm having M columns associated with each member of the ground-based antenna array.

24. The method of claim 23, further comprising employing, by the processor, one of the N rows of the matrix to determine the collective signal for the selected satellite by coherently summing each of the composite beams associated with each member of the satellite swarm and employing N−1 rows of the matrix for the composite beams from the non-selected satellites from the satellite swarm to filter cross-channel interference from the collective signal.

25. The method of claim 24, further comprising receiving, by the processor, timing and phase information from the satellite swarm and filtering the cross-channel interference from the collective signal via the matrix.

26. The method of claim 25, further comprising formatting, by the processor, M columns of the matrix to include a term for each member of the ground-based antenna array, wherein each term in each column of the matrix includes the phase information for each member of the satellite swarm multiplied by the composite signal for each member of the ground-based antenna array.

27. The method of claim 26, further comprising determining, by the processor, the collective signal by coherently summing one row of the matrix and employing the other N−1 rows of the matrix as a cancellation sum to subtract cross-channel interference to the collective signal attributed to the non-selected satellites of the satellite swarm.

28. A method for satellite communications, comprising:
receiving, by a processor, data from each member of a satellite swarm to each member of a ground-based antenna array, wherein the data includes coordination data and mission data that is shared between each member of the satellite swarm, wherein satellites of the satellite swarm exchange the coordination data and the mission data over cross-links between each other to generate communications data exchanged over a plurality of channels, wherein antennas of the ground-based antenna array receive the communications data generated by the satellites over the plurality of channels, wherein each of the antennas receives a composite signal from each of the satellites over the plurality of channels such that composite signals received at the antennas are digitized by a converter;
forming, by the processor, a composite beam for each channel created between the satellite swarm and the ground-based antenna array, the composite beam being formed from the composite signals digitized by the converter; and
analyzing, by the processor, the composite beams for each channel with respect to the coordination data to determine the mission data for a selected satellite from the plurality of satellites.

29. The method of claim 28, wherein the coordination data includes position data and velocity data for each of the plurality of satellites.

30. The method of claim 29, further comprising determining, by the processor, the position data and the velocity data from a predictive model or by instrumenting each member of the satellite swarm.

31. The method of claim 28, further comprising utilizing, by the processor, the coordination data to perform a data time-shift with respect to data transmissions from each of the other members of the satellite swarm to maximize reception of data generated by a given satellite at a selected antenna from the ground-based antenna array.

32. The method of claim 28, further comprising monitoring, by the processor, to determine the quality of a selected channel between one of the members of the satellite swarm and one of members of the ground-based antenna array.

33. The method of claim 32, wherein the quality of the selected channel is based on a bit error rate (BER).

34. The method of claim 32, further comprising communicating, by the processor, a data transfer rate increase or decrease to at least one member of the satellite swarm based on the determined quality of the selected channel.

* * * * *